United States Patent Office 3,609,847
Patented Oct. 5, 1971

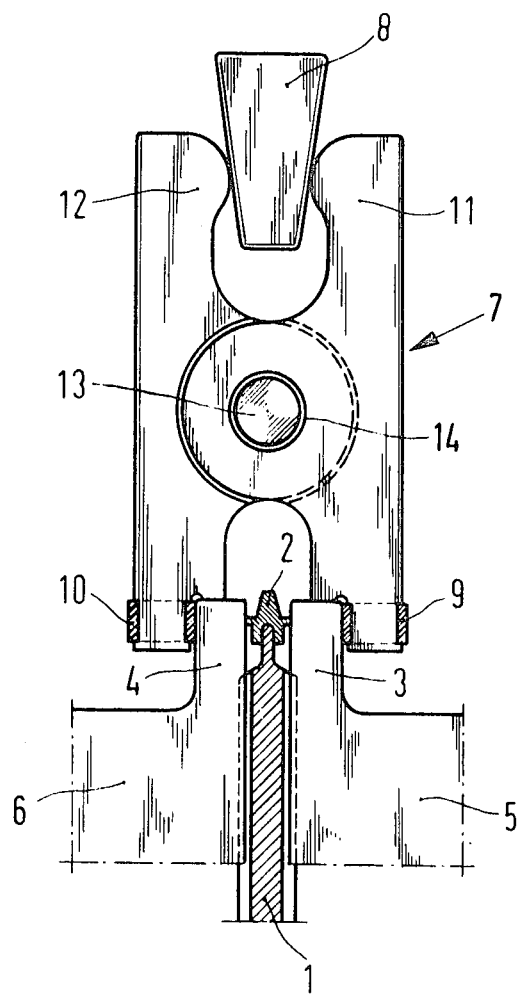

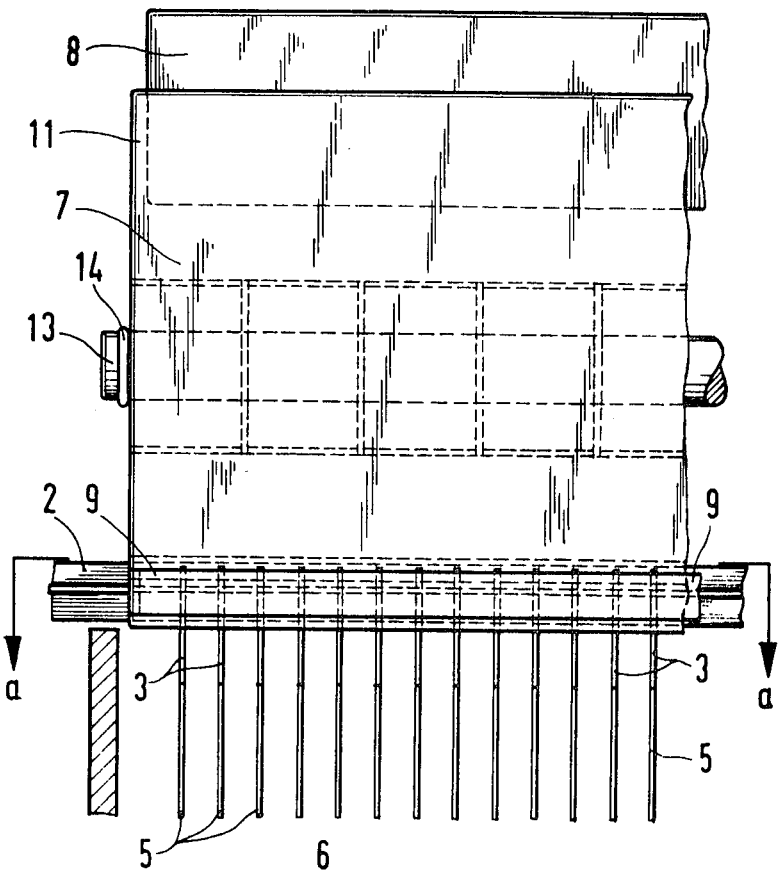
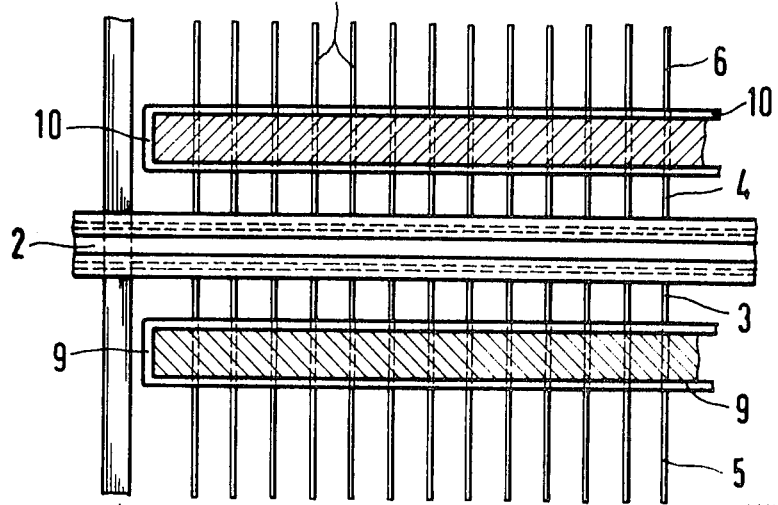

3,609,847
APPARATUS FOR MECHANICALLY AND ELECTRICALLY CONNECTING ELECTRODE PLATES
Hellmut Engler, Frankfurt am Main, Germany, assignor to Societe Industrielle du Caoutchouc S.A., Fleurier, Switzerland
Filed May 1, 1969, Ser. No. 820,865
Claims priority, application Germany, May 6, 1968, P 17 71 319.8
Int. Cl. H01m *19/04*
U.S. Cl. 29—204             7 Claims

ABSTRACT OF THE DISCLOSURE

For mechanically and electrically connecting electrode plates for storage batteries during the forming step, a gripper is provided, which is applicable to the lugs of the electrode plates so as to connect the plate lugs to a current-carrying terminal bar disposed between said lugs.

---

This invention relates to an apparatus for mechanically and electrically connecting electrode plates for storage batteries during the forming step.

When electrode plates for lead accumulators have been provided with active mass, they are placed in forming tanks, in which they are formed by electric current. In the previous practice, the individual electrode plates were electrically and mechanically connected at the plate lugs by soldering. This procedure is expensive and time consuming and for this reason undesirable in the manufacture. Specifically, the soldering or welding operations cannot be performed until the forming spaces have been thoroughly aerated.

It is an object of the invention to eliminate the complicated welding of each plate to the current-carrying bar.

In an apparatus of the kind described first hereinbefore, this object is accomplished according to the invention in that a gripper which is adapted to be applied to the lugs of the electrode plate is used to connect the plate lugs to a current-carrying terminal bar, which is disposed between said bar. The gripper consists preferably of two electrically interconnected, hinged plates, which are provided at their lower end with gripping jaws for engaging the plate lugs of the electrode plates. The gripper is preferably adjustable by means of a chucking wedge so that its jaw distance conforms to the width of the plate lugs. The connecting bar is preferably mounted on a ribbed plate of the forming vessel because the ribbed plates ensure a reliable positioning of the electrode plates. This is desirable for a satisfactory electrical connection. For this reason, the gripper according to the invention can be used to special advantage in connection with an insert structure for forming vessels for storage battery plates of any desired dimensions, where the plates are held in the vessel with the aid of dislocatable ribbed plates, which are provided with lateral mountings for correspondingly shaped guide bars, on which the ribbed plates are slidable in spaced-apart relation, the desired spacing between the ribbed plates being maintained by end stops and detachable spacers. Such insert structure is the subject matter of a prior invention assigned to the assignee of this invention. In the most preferred embodiment of the invention, a terminal bar is so mounted on at least one ribbed plate that the positive lugs of the electrode plates, which lugs are opposite to the terminal bar and protrude at least in pairs, are forced by a gripper against the current-carrying terminal bar, so that the electrode plates are conductively connected to the current-carrying terminal bar, and the actual gripping force is transmitted to the plate lugs by a chucking wedge or another expansible element and the contact pressure force is transmitted to the plate lugs desirably by a soft rubber strip. To protect the gripper from the corrosive action of sulfuric acid, the gripper consists of acid-resisting material, preferably of hard rubber or plastics material. The apparatus according to the invention permits an immediate installation of the plates into the forming vessels. No time and energy is required for welding and soldering. The connecting terminal bar can be mounted within a very short time and by unskilled persons. The current-supplying arrangement may be used many times because it is sufficient to brush the contact surface bright with the aid of a fine steel wire brush. The gripper is designed to have an opening width for plate lugs of 18 millimeters. With the aid of the chucking wedge, the jaw distance can be adjusted for lugs of 16, 14 and 12 millimeters.

In a particularly advantageous embodiment of the invention, the gripper is provided with detachable soft rubber strips in the area where the plate lugs are gripped. The use of a thicker soft rubber band facilitates the use of the gripper also for a plate lug of 10 millimeters. The resilient soft rubber band mounted on the gripper also permits of a compensation of small differences in the width of the plate lugs.

An embodiment of the invention will be described by way of example hereinafter with reference to the drawing, in which:

FIG. 1 is a sectional view taken through an upper portion of a ribbed plate provided with two electrode plates and an applied gripper.

FIG. 2 is a side elevation of FIG. 1, and

FIG. 3 is a sectional view taken on line *a—a* in FIG. 2.

A current-carrying, connecting terminal bar 2 is mounted on th ribbed plate 1 and consists preferably of lead. The connecting terminal bar 2 has two lateral arms, which are in electric contact with the plate lugs 3, 4 of at least two adjacent electrode plates 5, 6. A gripper 7 is applied, which engages the plate lugs at those edges thereof which are remote from each other so that the electric contact between the connecting terminal bar 2 and the electrode plates 5, 6 is ensured.

By means of a chucking wedge 8, the jaw distance of the gripper 7 is adjustable to the width of the plate lugs 3, 4. In the area for gripping the plate lugs 3, 4, the gripper 7 is provided with detachable soft rubber strips 9, 10.

The gripper 7 comprises two hinged plates 11, 12, which have mirror symmetry and are mounted on a pin 13 for pivotal movement relative to each other. The plates are held on the pin by rings 14, which are received by annular grooves at the end of the pin 13.

The connecting terminal bar 2 consists of soft lead. The length of the gripper 7 depends on the number of electrode plates to be connected.

The gripping device according to the invention can be handled most easily and damage to the plate lugs of the electrode lugs will be avoided when such apparatus is used.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which as exclusive property or privilege is claimed are defined as follows:

1. Apparatus for temporarily forming a releasable mechanical and electrical connection between at least a pair of aligned and coplanar electrode plates for storage batteries, each electrode plate having upstanding lugs on a corner thereof adjacent the upstanding lug on an aligned and coplanar electrode plate, said apparatus comprising:
- a separator plate positioned between said aligned and coplanar electrode plates to maintain a separation of said electrode plates, said separator plate having an upstanding lugs and adapted to engage opposing sursaid upstanding lugs;
- a current-carrying terminal bar separate from said electrode plates being releasably mounted on said rib of said separator plate substantially between said upstanding lugs and adapted to engage opposing surfaces of said lugs; and
- hinged jaw means adapted to engage the remote surfaces of said lugs, said hinged jaw means including means for moving said jaws toward one another into engagement with said remote surfaces of said lugs so that a continued movement of said jaws toward one another will cause the lugs of said electrode plates to move toward one another to clamp said current-carrying terminal bar between said opposed surfaces.

2. An apparatus according to claim 1, wherein said hinged jaw means comprise a pair of upstanding parallel plates extending parallel with said electrode plates, said upstanding plates being hingedly connected together and comprising gripping jaws at their lower ends which engage said opposite sides of said lugs on said electrode plates.

3. An apparatus according to claim 1, wherein said upstanding plates include means defining a recess on the opposite side of said hinged connection from said gripping jaws; and
wherein said means for moving said jaws toward one another comprises a wedgelike member receivable in said recess means to separate the sides of said recess means to thereby move said jaws toward one another.

4. An apparatus according to claim 1, wherein said separator plate is a part of a forming vessel.

5. An apparatus according to claim 1, wherein said hinged jaw means include detachable soft rubber strips in the area which engages said upstanding lugs of said electrode plates.

6. An apparatus according to claim 1, wherein said hinged jaw means comprises a pair of upstanding parallel plates having mirror symmetry and includes a pin for hingeably connecting same together, said pin having annular grooves adjacent the remote ends thereof; and
including annular rings which are adapted to fit over said remote ends of said pin and be received in said annular grooves to hold said plates on said pin.

7. An apparatus according to claim 1, wherein said separator plate, said terminal bar and said hinged jaw means are made of an acid-resisting plastics material.

References Cited

UNITED STATES PATENTS

| | | | |
|---|---|---|---|
| Re. 25,054 | 10/1961 | Rigsby | 136—134 |
| 1,879,099 | 9/1932 | Coffey | 29—246 |
| 1,888,800 | 11/1932 | Grothe | 29—246 |
| 2,189,327 | 2/1940 | Rieser | 136—134 |
| 3,476,611 | 11/1969 | Sabatino | 136—134 |
| 3,484,299 | 12/1969 | Nyberg | 136—134 |
| 3,515,597 | 6/1970 | Barnes | 136—134 |

FOREIGN PATENTS

| | | | |
|---|---|---|---|
| 1,087,466 | 10/1967 | Great Britain | 136—134 |

JOHN F. CAMPBELL, Primary Examiner

D. P. ROONEY, Assistant Examiner

U.S. Cl. X.R.

24—137, 139.1;29—246; 136—134